March 17, 1964

J. M. SELIGER ETAL 3,124,972

DIFFERENTIAL MECHANISM

Filed June 14, 1960

INVENTORS
JAMES M. SELIGER
HARRY J. HEGAR
BY Eugene M. Eckelman
ATTORNEY

March 17, 1964 J. M. SELIGER ETAL 3,124,972
DIFFERENTIAL MECHANISM
Filed June 14, 1960 3 Sheets-Sheet 2
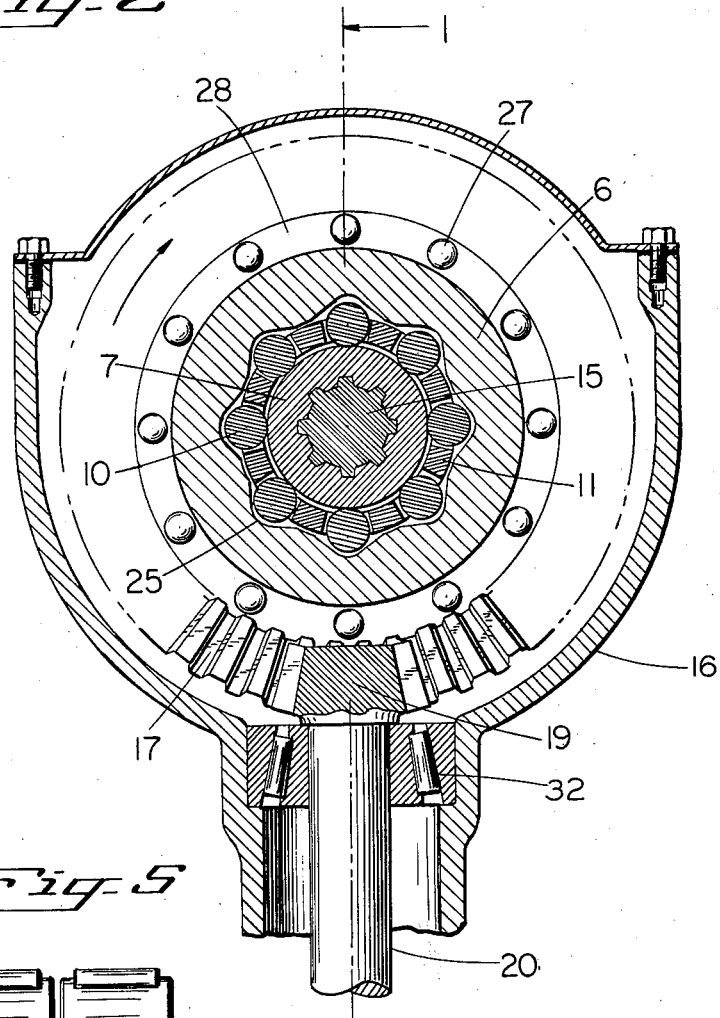
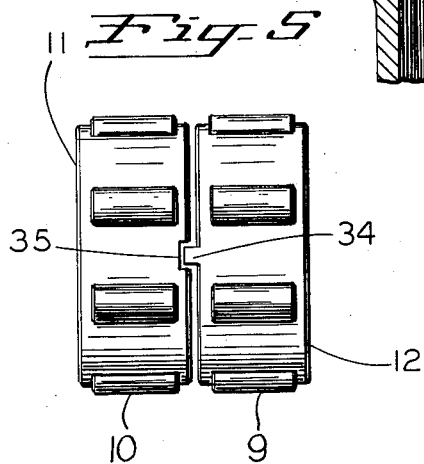
INVENTORS
JAMES M. SELIGER
HARRY J. HEGAR
BY Eugene M. Eckelman
ATTORNEY

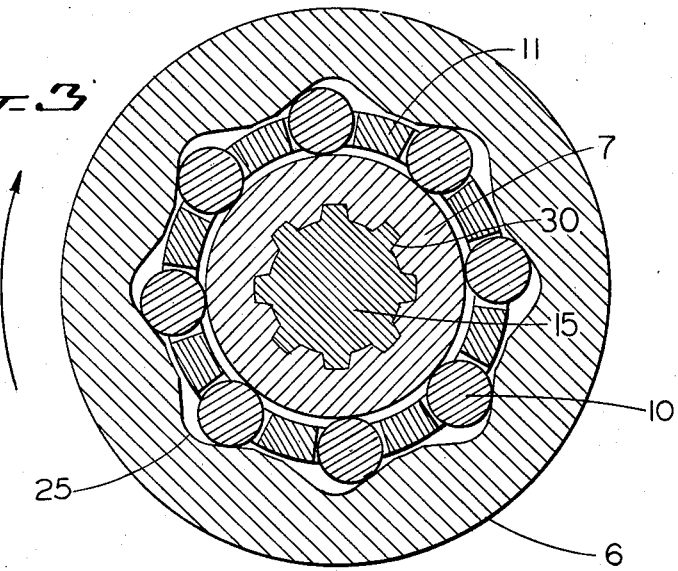
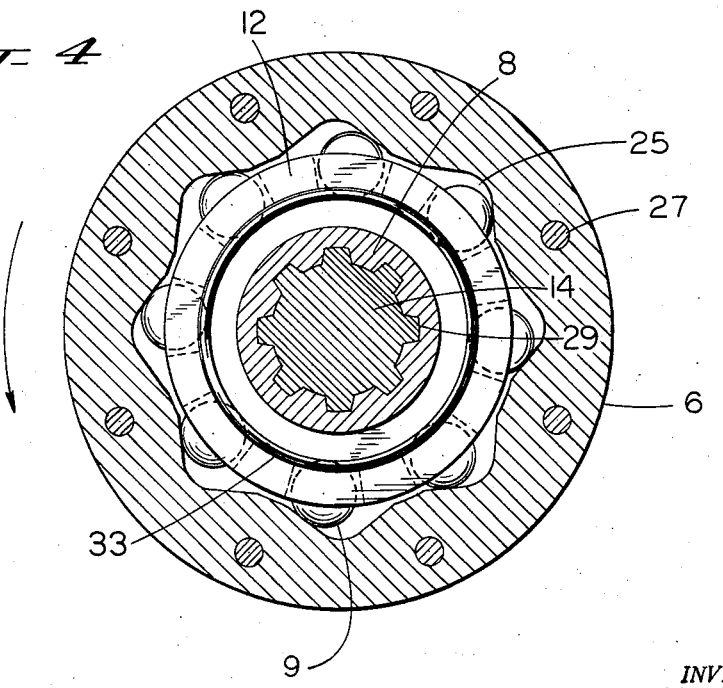

United States Patent Office 3,124,972
Patented Mar. 17, 1964

3,124,972
DIFFERENTIAL MECHANISM
James M. Seliger, 303 SE. 172nd Ave., Portland, Oreg., and Harry J. Hegar, Portland, Oreg., assignors, by mesne assignments, to James M. Seliger, Portland, Oreg.
Filed June 14, 1960, Ser. No. 35,930
1 Claim. (Cl. 74—650)

Our invention relates to a power transmission mechanism, and more particularly to a differential type mechanism for motor vehicles and other machines.

An object of our invention is to provide an automatic differential driving mechanism which is structurally characterized by the absence of relatively expensive differential gearing and substituting therefor means more effective than conventional differential drive mechanism.

More particularly, it is an object to provide a differential mechanism which in its application to motor vehicles such as passenger cars, trucks, tractors, lift trucks, lumber carriers, etc., and/or other machinery where a differential driving mechanism is applied, is absolutely positive in driving the right and left wheels in both forward and reverse directions, and which delivers the power to either wheel should the other wheel have less or no traction, in contrast to the conventional type of differential mechanism in which the wheel having the less traction receives the power, which thus is wasted.

Another object of our invention is to provide an automatic power differential driving mechanism of the above described character which renders the vehicle inherently stable at all speeds by preventing side sway and wandering movements; which is a powerful automatic aid in restoring the vehicle to a straight course following a turn, irrespective of whether the turn is made to the right or left under power or when coasting, all to the end precluding, if not absolutely preventing, spinning or skidding of the vehicle on the road irrespective of on or off highway conditions considering the type of vehicle, providing it has one positive traction factor.

A further object of our invention is to provide a mechanism of the above described character, which in its application to a motor vehicle, is operable to drive the right and left wheels independently of each other during straight-ahead, turning or curving movements of the vehicle whether traveling on muddy, icy, or snow laden roads, or terrain, all while insuring a full and complete differential action of the wheels when the vehicle is traveling in other than a straight-ahead course, and with the added advantage that should either the right or left axle of the divided wheel axle break, the other axle section will propel the vehicle so as to enable same to continue travel in a normal manner until repairs can be made, rather than be stalled on the road or terrain as would be the case under similar conditions with the conventional gear type of differential mechanism in universal use.

The invention will be better understood and additional objects will become apparent with reference to the accompanying drawings, wherein:

FIGURE 2 is a transverse sectional view of the mechanism, taken on the line 2—2 of FIGURE 1;

FIGURE 3 is a sectional view taken on the line 3—3 of FIGURE 1 and showing locking drive means for establishing a drive connection;

FIGURE 4 is a sectional view taken on the line 4—4 of FIGURE 1 and also showing details of the locking drive means; and FIGURE 5 is a detail view of a portion of the locking drive means showing in particular control means effecting a novel cooperating action between elements thereof.

Figure 1:
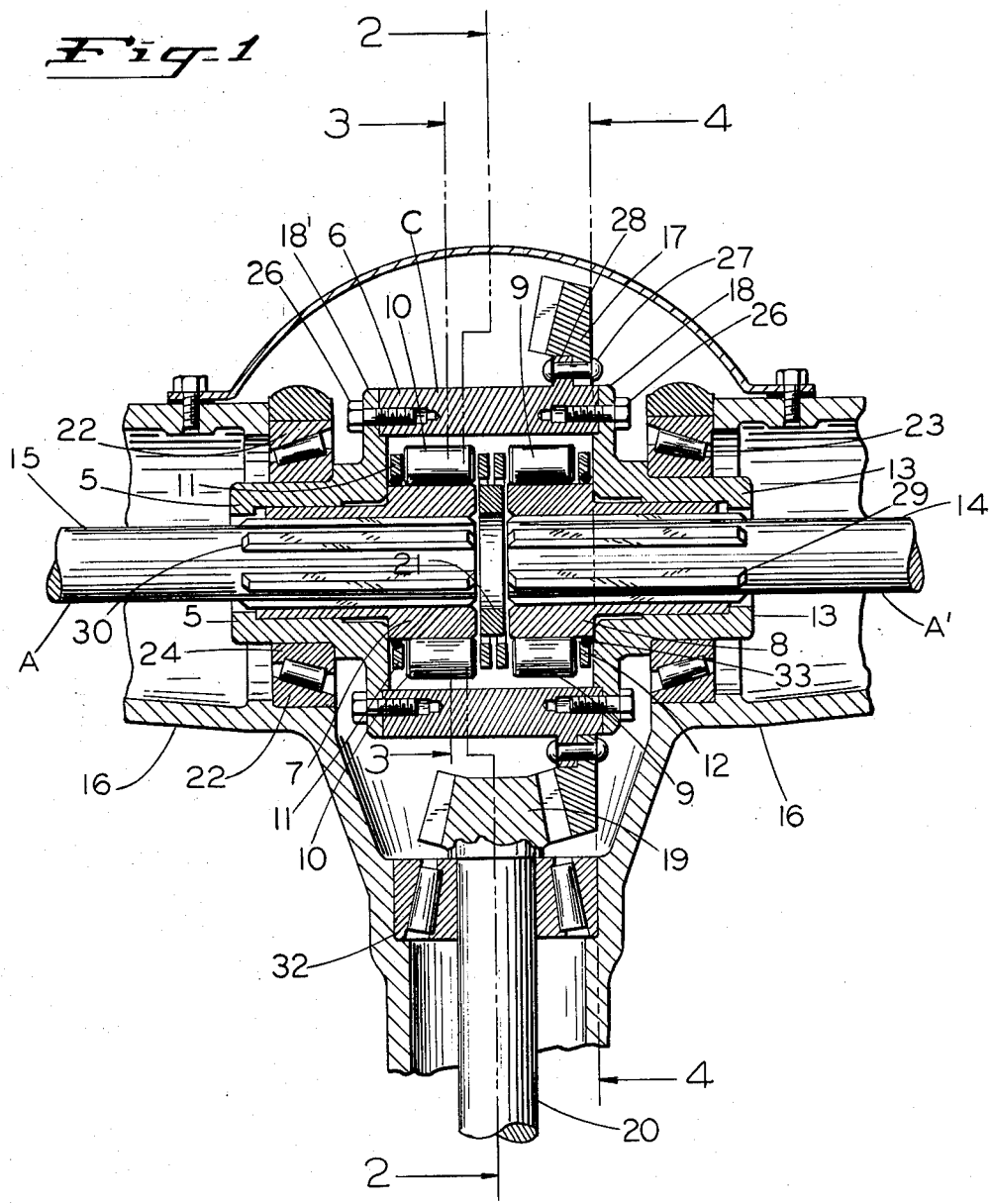
FIGURE 1 is a longitudinal sectional view of a differential mechanism employing the principles of the present invention, taken on the line 1—1 of FIGURE 2.

Referring specifically to the drawings, our invention in its preferred embodiment comprises a support in the form of a cylindrical case C, composed of a rotatable, annular body section 6 and end sections 18—18' closing the ends of the body section, the body and end sections being integrally connected together by cap screws 26 extending through suitable apertures at circumferentially spaced intervals in the end sections and threaded in tapped bores in the section 6.

The end sections 18—18' are provided with right and left tubular mounting extensions 5, 13, respectively, for inner bearing races 24 of bearings 23 of the anti-friction roller type, said bearings having outer races 22 rigidly supported in a housing 16. For the present purpose housing 16 may be disposed at the rear and/or front of the vehicle whichever the case may be, and as apparent, rotatably supports the case C therein.

The body section 6 of the case C is provided with a flange 28 to which is rigidly secured coaxially of the case by rivets or bolts 27 a ring gear 17. The gear 17 constantly meshes with and is driven by a pinion gear 19 journaled in an anti-friction bearing 32 in the forward tubular extension of the axle housing 16 and fixed to the usual propeller shaft 20.

Right and left driven members 7 and 8, respectively, in the form of cylindrical tubular bodies, are arranged in coaxial relation within the body section 6 and are provided with diametrically reduced extensions journaled in the extensions 5 and 13, respectively, of the end sections. Driven members 7 and 8 have splined connections 30, 29, respectively wtih the inner ends of independently rotatable shafts 15, 14 which in the illustrated embodiment of our invention, constitute the right and left axle sections A, A' of a divided wheel axle.

The driving elements comprise caged rollers 9 and 10, acting upon the periphery of the center driven segments 8 and 7, respectively, and consequently driven by segment 6 through a wedging action. The wedging action is created by hyperbolic segments or curved areas 25 placed at even intervals on the internal periphery of the annular driving body section 6. As one purpose of such structure there is provided a greater contact or drive connection area than in the conventional type differential, thereby constituting more positive drive. The number of driving elements 9 or 10 correspond to the number of hyperbolic segments 25 and are in the form of hardened round metal bars having their axes parallel to the axis of the body section 6. Rollers 9 and 10 are adapted to wedgingly engage between body section 6 and driven members 8 and 7, respectively, to drive the respective axle sections or free same for differential movements.

The rollers 10 are confined in radial slots in a cage 11 of tubular construction, FIGURES 2, 3 and 5, and the rollers 9 are confined in radial slots in a similar cage 12, both of the cages 11 and 12 being rotatably mounted on the driven members 7 and 8, respectively.

A friction device 33 which may comprise an O-ring formed of a neoprene substance is inserted between driven member 7 and cage 11 and between driven member 8 and case 12 and caused to bear frictionally against said driven members, causing a slight retarding action to hold the roller cages 11 and 12 in desired positions.

As apparent in FIGURE 5, cage 12 has a key or projection 34 extending beyond one end thereof in a direction parallel to the axis of the cage. In the assembled position of the parts this key extends into an enlarged keyway slot 35 in cage 11. In a preferred arrangement a pair of cooperating key and keyways may be provided with such units being disposed diametrically.

Keyways 35 have a width greater than the width of keys 34 and for the present purpose and referring either to FIGURES 2, 3 or 4, the relative movement of the cages which is permitted by said key and keyways comprises approximately one-half the distance of the total travel of a roller 9 or 10 from one side of the hyperbolic segment to the other side. Such structure accomplishes an improved differential action which will now be described.

Let it be assumed that a mechanism embodying our invention is installed in a motor vehicle, and that power is being applied to the propeller shaft 20 to drive the ring gear 17 and hence the case 6 through the pinion gear 19 in a direction to drive the vehicle forwardly, which corresponds to the direction of rotation of the case as indicated by the arrows in FIGURES 3 and 4. With the vehicle traveling straight ahead and with the right and left wheels having equal traction on the road, the driving elements occupy the extreme position shown in FIGURE 3, in which the sets of rollers 9 and 10 will be wedged by the working faces 25 of the driving elements against the peripheries of the respective driven members 8 and 7 so as to positively drive same and hence the right and left wheels at one and the same speed.

However, upon executing a left turn under power, for example, the left wheel (axle A') will be positively driven through the rollers 9 whereas the faster traveling right wheel which now requires a differential action, will, through the faster traveling right driven member 7 cause the friction ring 33 to drag the roller cage 11 therewith through a sufficient rotative amount in the anti-clockwise direction for the rollers to be disengaged from their wedge driving relationship against the working surfaces of the driving chamber 25, as shown in FIGURE 2, and to be moved to the idle position shown in this figure wherein the roller cage 11 is stopped in a neutral position. Such neutral position is accomplished by cooperation of the keys 34 and keyways 35, i.e., such cage cannot move in the opposite direction more than half way of the travel of the rollers in the segments 25.

Upon executing a right turn under power, the right wheel will now be positively driven through the rollers 10, whereas the faster traveling left wheel which now requires the differential action, will through the faster traveling left driven member 8 cause the friction ring 33 to drag the roller cage therewith through a sufficient rotating amount for the rollers 9 to be disengaged from their wedged driving relationship against the working surfaces of the driving elements 6 and to be moved to their neutral or idle position corresponding to that position previously occupied by the rollers 10 in executing a left turn under power so that the driven member 8 will rotate freely in the case 6 with a true differential action irrespective of the radius of the turn.

Should the power be removed from the propeller shaft 20 during straight-ahead travel of the vehicle the cages 11 and 12 will be dragged by the friction ring 33 to cause the rollers 10 and 9, respectively, to shift to the other extreme position and then lock against the opposite working surfaces 25 of the driving elements so as to maintain the positive driving connection to the propeller shaft 20.

Should the power be removed from the propeller shaft when executing a right or left turn, the faster traveling outside wheel on the turn will cause the rollers 9 or 10, as the case may be, to shift the driving elements to the position of FIGURE 3, and to lock against the working surfaces 25 of the elements, whereas the other rollers will remain in their idle position so that a true differential action will be imparted to the inside wheel irrespective of the radius of the turn.

The same differential action will be obtained when backing the vehicle with or without power, either in a straight course or when executing turns. Should either wheel be stuck in a rut, or be under any road condition in which one wheel has greater traction than the other, the driving element 6 and the sets of rollers 9 or 10 as the case may be, will co-act with the respective driven member 8 or 7 to automatically lock the driven member into a driving position to activate the wheel having the greater traction, to the propeller shaft when being driven, until the traction of both wheels is equalized, rather than waste the power on the wheel having less traction as is the function of conventional differential mechanisms now in common use.

It is to be understood that the form of our invention herein shown and described is to be taken as a preferred example of the same and that various changes in the shape, size and arrangement of parts may be resorted to without departing from the spirit of our invention or the scope of the subjoined claim.

Having thus described our invention, we claim:

A differential driving mechanism comprising a rotatable drive casing, a pair of driven members coaxially mounted in end to end relation in said casing for independent rotation, recesses on the inner periphery of said drive casing, rollers freely mounted between said casing and each of said driven members for circumferential movement between a released position and a drive connection between said casing and said driven members in either direction by a wedging action of the rollers therebetween, a pair of annular cages for the rollers freely mounted concentrically on said driven members for adjustable rotation relative thereto, a pair of longitudinal extending slots in one of said cages extending inwardly from one of the ends of the latter, a pair of projections in the other of said cages engaged with respective ones of said slots, the width of said slots being greater than the width of said projections, said width relationship of said slots and projections being preselected whereby to permit relative rotation of said cages equal to approximately one-half of the free movement of said rollers between their released and driving connections in said recesses to disengage the rollers in one cage from one of said driven members and hold them in an intermediate disengaged position in the recesses upon a differential requirement of said mechanism, and an O-ring operative frictionally between said cages and said driven members to provide relative rotation of said cages in response to a differential requirement.

References Cited in the file of this patent

UNITED STATES PATENTS

| | | |
|---|---|---|
| 1,546,460 | Andrade | July 21, 1925 |
| 1,823,389 | De Lavaud | Sept. 15, 1931 |
| 2,425,203 | Peterson et al. | Aug. 5, 1947 |